No. 854,672. PATENTED MAY 21, 1907.
C. B. SHEPARD.
PACKING.
APPLICATION FILED SEPT. 17, 1906.
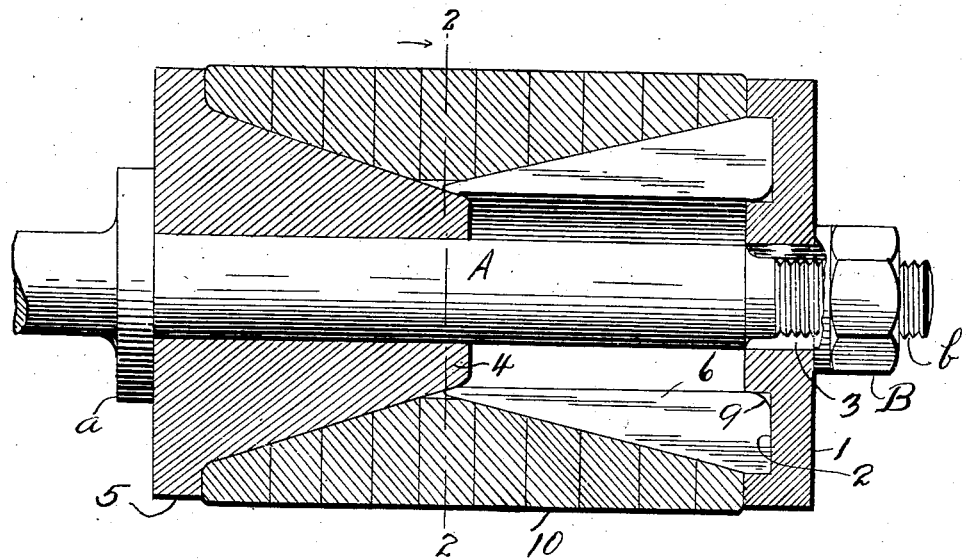
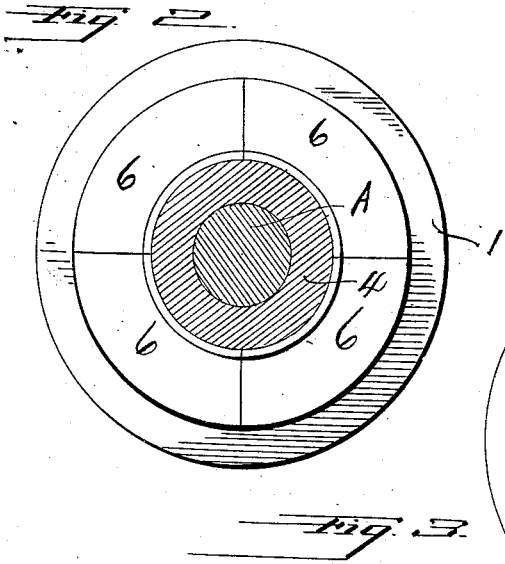
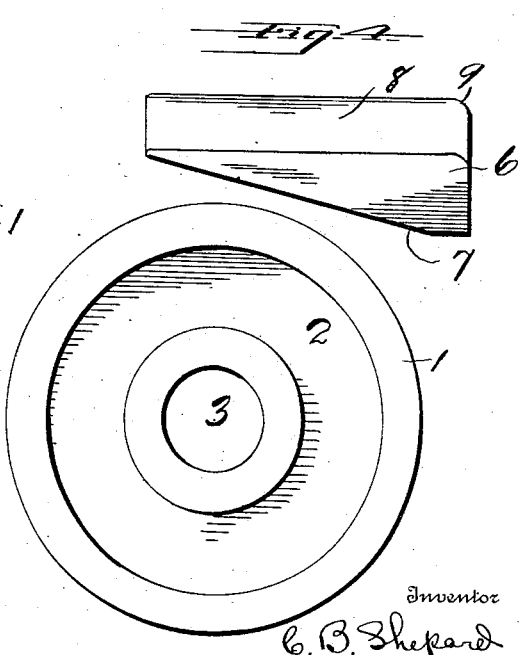
Witnesses
Chas. K. Davies
John Powers
Inventor
C. B. Shepard
By Shepherd Parker
Attorneys

UNITED STATES PATENT OFFICE.

CHARLES B. SHEPARD, OF GALENA, KANSAS.

PACKING.

No. 854,672.  Specification of Letters Patent.  Patented May 21, 1907.

Application filed September 17, 1906. Serial No. 335,009.

To all whom it may concern:

Be it known that I, CHARLES B. SHEPARD, a citizen of the United States, residing at Galena, in the county of Cherokee and State of Kansas, have invented certain new and useful Improvements in Packings, of which the following is a specification.

This invention relates to new and useful improvements in packing and it particularly pertains to a packing adapted for pistons of pumps, engines, or slide valves.

The invention aims as a primary object to provide a packing in which the wear may be readily compensated by a novel adjusting means embodied in the invention as an entirety.

The invention aims as a further object to provide a device of the above type which shall be simple in construction, inexpensive to manufacture and practical and efficient in use.

The detailed construction will appear in the course of the following description in which reference is had to the accompanying drawings forming a part of this specification, like numerals designating like parts throughout the several views, wherein, Figure 1 is a central longitudinal section of a packing constructed in accordance with my invention. Fig. 2 is a transverse section on the line 2—2 of Fig. 1. Fig. 3 is an underneath plan view of an adjustable head to be hereinafter specifically referred to, and Fig. 4 is a detailed side elevation of an element of the invention to be hereinafter specifically referred to.

Referring specifically to the accompanying drawing the letter A designates the piston rod provided with an annular retaining flange $a$ and with a reduced extremity threaded as at $b$ for the reception of an adjusting nut B. The nut B bears against a movable head 1 which loosely surrounds the rod A and which is formed on its inner surface with an annular recess 2 concentric to the central opening 3 of said head. The retaining flange $a$ serves as a stop or support for a coniform member 4 loosely surrounding the rod A and provided at its lower end with an annular flange or extension 5. The member 4 coacts with elements carried by the head 1 to afford a substantially concaved or hour glass shape bearing surface. These elements are shown in detail in Fig. 4 and severally comprise a member 6 formed with an inclined side 7, a concaved side 8 and a rounded upper edge 9. The members 6 interfit in the recess 2, and as an entirety serve to afford a coniform follower for effecting an adjustment of the packing rings 10 held between the flange 5 and the outer portion of the head 1 in conformable relation to the bearing surface between said flange and said head. In this relation the lower ends of the members 6 overlap the inclined surface of the member 4 and ride upon said surface in effecting an adjustment of the packing rings 10.

From the foregoing description the manner of use will be readily apparent. By turning the nut B in the proper direction the head 1 may be forced inwardly to take up the wear upon the rings 10. In this operation, the rounded edge 9 of the members 6 permits of said members having a limited play or pivotal movement in the recess 2, whereby said members are permitted a slight degree of relative expansion in their assembled relation.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. In a piston packing the combination with a piston rod of a stationary coniform element surrounding the same and carried thereby a movable head surrounding said rod, an inverted coniform element seated within said head, said element comprising independent sections having their ends overlapping said first named element and packing rings clamped between said head and said first named element.

2. In a piston packing the combination with a piston rod of a stationary coniform element surrounding the same and carried thereby, a movable head loosely surrounding said rod and formed with an annular recess, an inverted coniform element comprising independent co-extensive sections seated with their larger ends in said recess and having a limited play therein, the lower ends of said sections overlapping said element, an adjusting nut threaded upon said rod and engaging said head and packing rings clamped between said head and said first named coniform element.

In testimony whereof I affix my signature in presence of two witnesses.

CHARLES B. SHEPARD.

Witnesses:
    FLETCHER R. MCGINNIS,
    TIM J. O'SULLIVAN.